(12) United States Patent
Twisselman (10) Patent No.: US 10,749,464 B2
(45) Date of Patent: Aug. 18, 2020

(54) VEHICULAR SYSTEMS AND METHODS FOR CLEANING PHOTOVOLTAIC PANELS

(71) Applicant: Sterling Twisselman, San Luis Obispo, CA (US)

(72) Inventor: Sterling Twisselman, San Luis Obispo, CA (US)

(*) Notice: Subject to any disclaimer, the term of this patent is extended or adjusted under 35 U.S.C. 154(b) by 114 days.

(21) Appl. No.: 15/638,222

(22) Filed: Jun. 29, 2017

(65) Prior Publication Data

US 2019/0006985 A1 Jan. 3, 2019

(51) Int. Cl.
*H02S 40/10* (2014.01)
*B60P 3/30* (2006.01)
*B08B 3/02* (2006.01)
*F24S 40/20* (2018.01)

(52) U.S. Cl.
CPC .............. *H02S 40/10* (2014.12); *B08B 3/024* (2013.01); *B60P 3/30* (2013.01); *F24S 40/20* (2018.05); *B08B 2203/02* (2013.01)

(58) Field of Classification Search
CPC . H02S 40/10; H02S 40/12; B08B 3/02; B60P 3/30; B64F 5/23; B64F 5/30; F24S 40/20; E01H 3/02; A01M 7/005; A01M 7/0053; A01M 7/0057; A01M 7/006; B60G 2300/083
See application file for complete search history.

(56) References Cited

U.S. PATENT DOCUMENTS

| | | | | |
|---|---|---|---|---|
| 1,761,723 A | * | 6/1930 | Greer | E01H 1/101 239/172 |
| 1,984,017 A | * | 12/1934 | Hanlon | F24H 1/181 220/612 |
| 2,699,967 A | * | 1/1955 | Edinborough | A01M 7/0053 239/164 |
| 2,995,307 A | * | 8/1961 | McMahon | A01M 7/0053 239/161 |
| 3,683,842 A | * | 8/1972 | Logan | B60Q 1/30 362/542 |
| 6,422,483 B1 | * | 7/2002 | Yocom | A01M 7/0053 239/159 |
| 9,022,048 B2 | | 5/2015 | Mendez De La Cuesta | |
| 9,060,659 B2 | | 6/2015 | Lu | |
| 2009/0288679 A1 | * | 11/2009 | Pietsch | B08B 3/12 134/1 |
| 2010/0300496 A1 | * | 12/2010 | Souza | F24S 40/20 134/104.4 |
| 2011/0094542 A1 | | 4/2011 | Gonzalez Rodriguez | |

FOREIGN PATENT DOCUMENTS

| | | |
|---|---|---|
| CN | 102773224 B | 3/2014 |
| CN | 203725440 U | 7/2014 |
| CN | 103920667 B | 12/2015 |

(Continued)

*Primary Examiner* — David G Cormier
(74) *Attorney, Agent, or Firm* — Insigne LLP (57) ABSTRACT

A mobile washing system and methods for washing photovoltaic panels. The mobile washing system includes a vehicle, a fluid tank coupled to the vehicle, and a washing apparatus mounted to a side of the vehicle. The washing apparatus includes two generally longitudinal spray pipes that are configured to be rotated and vertically adjusted with respect to the vehicle to position the spray pipes generally parallel to a top surface of the photovoltaic panels.

15 Claims, 9 Drawing Sheets

(56) References Cited

FOREIGN PATENT DOCUMENTS

| CN | 105107772 | A | 12/2015 |
|----|-----------|---|---------|
| CN | 103736685 | B | 3/2016 |
| CN | 105583183 | A | 5/2016 |
| CN | 103658116 | B | 8/2016 |
| EP | 2581687 | A1 | 4/2013 |
| ES | 1068713 | U | 11/2008 |

\* cited by examiner

VEHICULAR SYSTEMS AND METHODS FOR CLEANING PHOTOVOLTAIC PANELS

BACKGROUND OF THE INVENTION

1. Field of the Invention

The present invention relates generally to vehicular cleaning systems, and more specifically to vehicular cleaning systems for cleaning photovoltaic panels.

2. Discussion of the Related Art

Photovoltaic facilities, also known as solar farms, typically include photovoltaic (PV) panels (also referred to as solar panels). The PV panels have reduced output when the surface of the panel is dirty. Therefore, it is desirable for the PV panels to be periodically cleaned to maintain output levels. Solar farms generally include large numbers of solar panels mounted on the ground in multiple rows, with the solar panels tilted upward at an angle with respect to the ground.

Systems and methods known in the art for cleaning PV panels include manual washing with purified water and/or suitable cleaning products. However, this method is slow and requires a large amount of labor.

Systems using vehicles to move a cleaning apparatus down a row of PV panels are also known in the art. For example, Chinese Patent No. 102773224 discloses a vehicle with a movable cantilever apparatus extending to one side, with a de-duster mechanism including a brush coupled to the distal end of the cantilever. As the vehicle travels down the row of panels, the brush contacts the surface of the panels and dusts the panels.

U.S. Pat. No. 9,060,659 includes a vehicle with a side movable cantilever apparatus coupled to a cleaning apparatus. The cleaning apparatus includes a sweeping unit, a blower unit, and a liquid-spraying unit.

U.S. Patent Application Publication No. 2011/0094542 discloses a vehicle with a side movable cantilever apparatus coupled to a cleaning device. The cleaning device includes nozzles for spraying steam onto the panels, as well as a squeegee-type cleaning element.

U.S. Pat. No. 9,022,048 describes a side movable cantilever arm mounted on a vehicle. A projection bar is mounted to the end of the arm and includes spray arms configured to spray liquid onto the panels.

SUMMARY OF THE INVENTION

In one embodiment, the invention can be characterized as a mobile washing system comprising: a vehicle; a fluid tank coupled to the vehicle; and at least one spray pipe mounted near a side of the vehicle in a generally vertical orientation in a first position, wherein the mounting provides for at least one of vertical and rotational movement of the spray pipe relative to the vehicle, wherein the at least one spray pipe is fluidly coupled to the fluid tank via at least one fluid line and includes a plurality of spray heads configured to spray fluid.

In another embodiment, the invention can be characterized as A method for washing at least one panel mounted at an angle to the ground and having a length, comprising the steps of: deionizing water; placing the deionized water into a tank of a mobile washing system, wherein the mobile washing system also comprises a vehicle and a washing apparatus mounted on a side of the vehicle and fluidly coupled to the tank, wherein the washing apparatus is in a first generally vertical position; driving of the vehicle to a panel location and orienting the vehicle such that the washing apparatus is interposed between the panel and the vehicle when the vehicle is driving generally parallel to the length of the panel; adjusting of the washing apparatus to a second washing position whereby a plurality of spray heads of the washing apparatus are located at a generally consistent distance from a top surface of the panel; pumping the water from the tank through the plurality of spray heads, whereby the water is sprayed from the spray heads; and driving the vehicle along the length of the panel whereby the spray heads spray the top surface of the panel with the water.

BRIEF DESCRIPTION OF THE DRAWINGS

The above and other aspects, features and advantages of several embodiments of the present invention will be more apparent from the following more particular description thereof, presented in conjunction with the following drawings.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
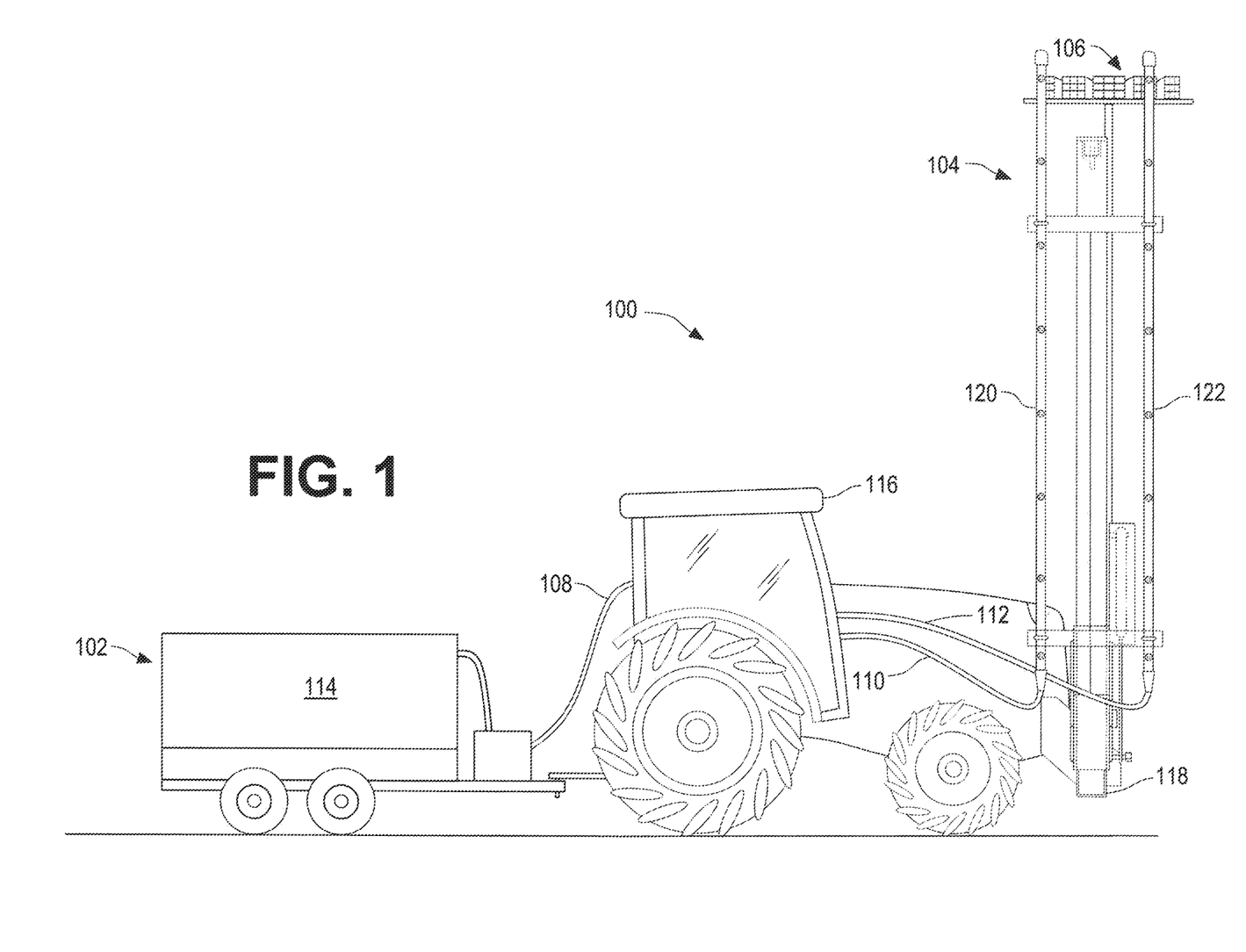
FIG. 1 is a side elevational view of a mobile PV washing system in a first (non-washing) position in accordance with one embodiment of the present invention.

Referring first to FIG. 1, a side elevational view of a mobile PV washing system 100 in a first (non-washing) position is shown in a first embodiment of the present invention. Shown are a water trailer 102, a washing apparatus 104, a light tower 106, a tank line 108, a first fluid line 110, a second fluid line 112, a wash machine water tank 114, a tractor 116, a support apparatus 118, a first spray pipe 120 and a second spray pipe 122. The washing apparatus 104 is shown in a non-deployed position (i.e. the position of the washing apparatus 104 when washing is not occurring). For clarity, hydraulic lines and electrical cords are not shown.

The mobility of the mobile PV washing system 100 is provided by the tractor 116. It will be understood by those of ordinary skill in the art that other suitable types of vehicles may be used. In the present embodiment, the washing apparatus 104 is configured to mount to John Deere tractor models 5083EN, 5093EN, 50101EN, 5075GV, 5090GV, 5075GI, 5090GN, and 5100GN with the same attachment plates 402 as described below in FIGS. 4 and 5. The washing apparatus 104 may also be mounted to New Holland tractor models T4.75V, T4.85V, T4.95V, T4.105V, T4.80V, T4.90V, T4.100V, and T4.110V 75V, with modifications to attachment plates 402. It will be obvious to those of ordinary skill in the art that the washing apparatus 104 may be mounted to other vehicles having existing threaded holes for mounting by making modifications to the attachment plates 402, the winch support 426, or the support apparatus 118, etc. The washing apparatus 104 and the optional light tower 106 (shown below in FIG. 2) are mounted to and supported by a front portion of the tractor 116. The washing apparatus 104 is generally located at the left side of the tractor 116 as viewed from the front (as in FIG. 2) The optional light tower 106 is mounted to and supported by the support apparatus 118 and is generally located at the right side of the tractor 116 as viewed from the front (as in FIG. 2). The light tower 106 extends generally vertically upward and includes at least one light 440. In one embodiment the light tower 106 is mounted to an extension beam of the support apparatus 118 and is movable with the extension beam. The water trailer 102 is wheeled and is coupled to the rear of the tractor 116 such that the water trailer 102 is towed behind the tractor 116. In the present embodiment, the water trailer 102 includes dual wheel axles and has a trailer width to generally match a width of the tractor 116. The water trailer 102 includes the wash machine water tank 114.

The washing apparatus 104 as presently shown includes two generally vertical spray pipes 120 122. Each spray pipe 120 122 is coupled to one fluid line 110 112 and configured to spray water. Each fluid line 110 112 is coupled to and receives fluid, in the present embodiment purified water, from the wash machine water tank 114 via the tank line 108. The flow of fluid is described in more detail in the schematic diagram of FIG. 6. As described herein, the fluid may also be described as water, as water will typically be used for cleaning, but it will be understood that in some embodiments fluids other than water may be used in the PV washing system 100.

The washing apparatus 104 is configured for vertical and rotational adjustment and is described in more detail below in FIGS. 3-5.

In operation, the wash machine water tank 114 is filled with filtered and deionized water. The tractor 116 is driven to the location of a row of PV panels 300. The PV panels 300 are mounted at an angle relative to the ground. An operator of the tractor adjusts the angle and vertical position of the washing apparatus 104 such that the spray pipes 120 122 are next to and generally parallel to a PV panel top surface 302. The operator then operates washing apparatus controls to send the water from the wash machine water tank 114 to the spray pipes 120 122, whereby the water is sprayed from a plurality of spray heads 418 coupled to the spray pipes 120 122, cleaning the PV panels 300. The operator then drives down the row of PV panels 300, with the water from the spray heads 418 continuing to clean each PV panel 300 as the operator drives the tractor 116 down the row. The operation of the PV washing system 100 is described in more detail below in FIGS. 3-5.

Figure 2:
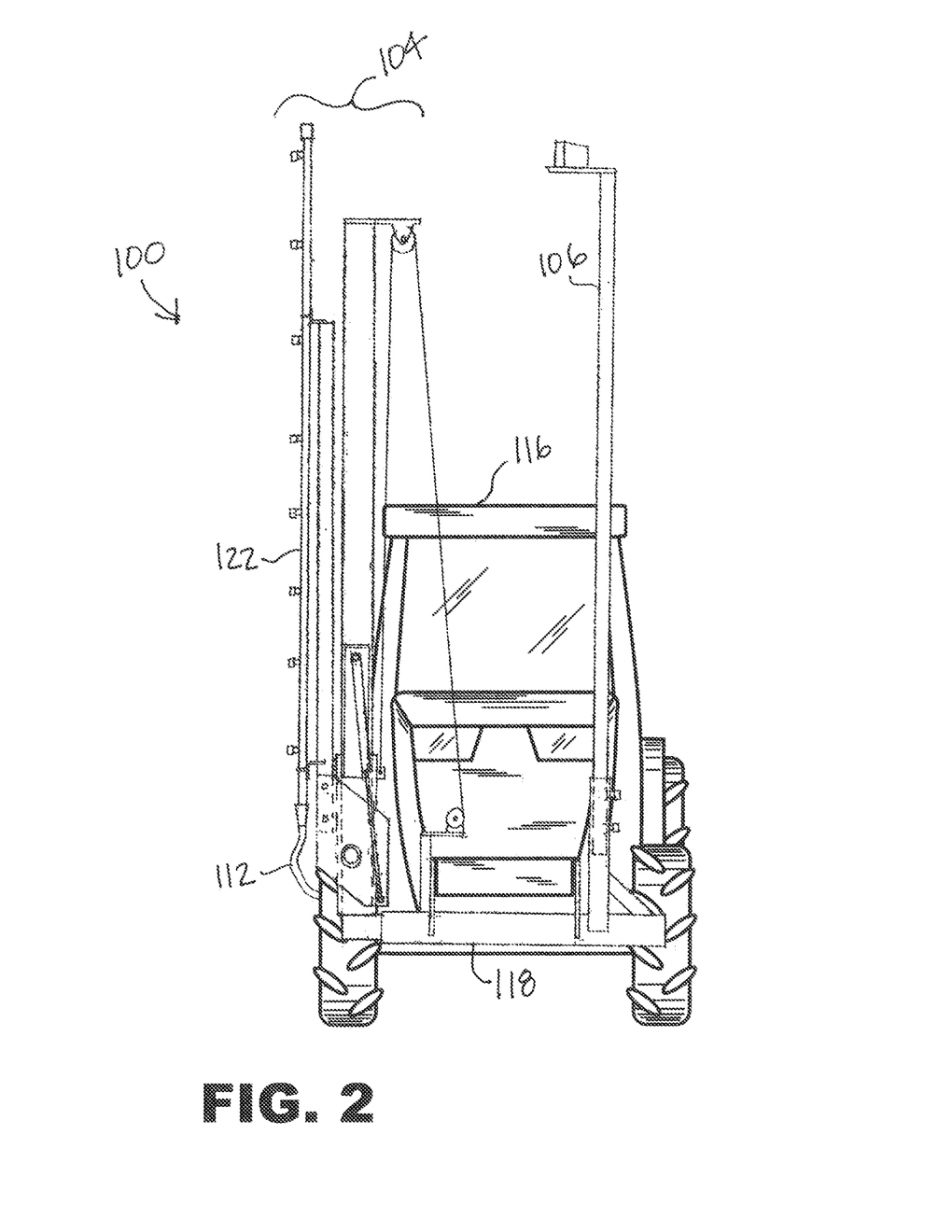
FIG. 2 is a front elevational view of the mobile PV washing system in the first position.

Referring next to FIG. 2, a front elevational view of the mobile PV washing system 100 in the first position is shown. Shown are the, the washing apparatus 104, the light tower 106, the second fluid line 112, the second spray pipe 122, the tractor 116, and the support apparatus 118. The washing apparatus 104 is again shown in the non-deployed position (i.e. the position of the washing apparatus 104 when washing is not occurring). For clarity, hydraulic lines and electrical cords are not shown.

As previously described, the washing apparatus 104 is coupled to the front portion of the tractor, such that the washing apparatus 104 is on the left-hand side and the optional light tower 106 is located on the right-hand side as viewed from the front (as in FIG. 2). In another embodiment the washing apparatus 104 is on the right-hand side and the light tower 106 is on the left-hand side. In yet another embodiment two washing apparatuses 104 are installed, one on each side. The washing apparatus 104 includes the spray pipes 120 122. The second spray pipe 122 is visible in the front elevational view of FIG. 2. As previously described, the spray pipes 120 122 are fluidly coupled to and receive the fluid (generally purified water) from the wash machine water tank 114 shown in FIG. 1.

Figure 3:
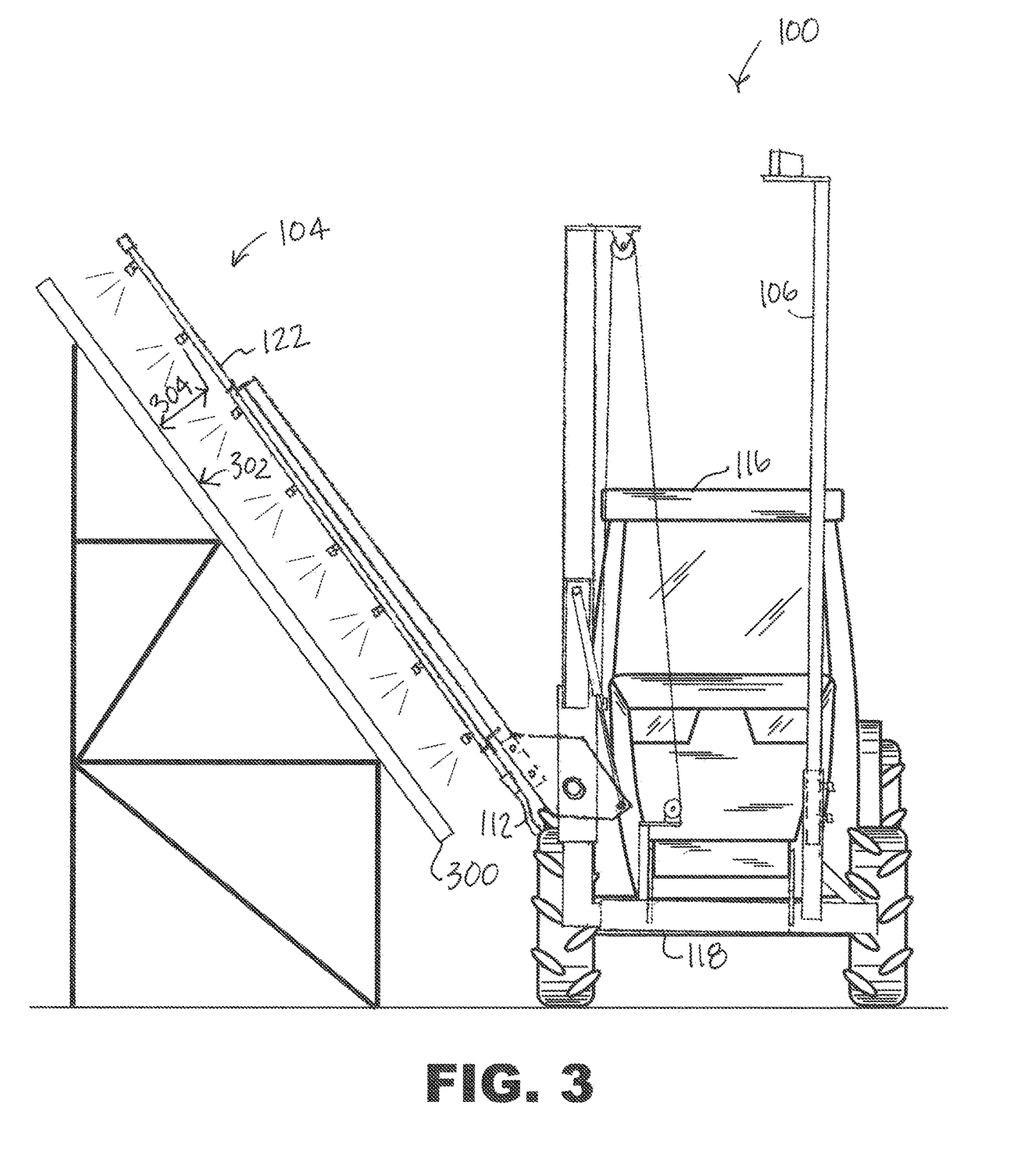
FIG. 3 is a front elevational view of the mobile PV washing system in a second deployed (washing) position.

Referring next to FIG. 3, a front elevational view of the mobile PV washing system 100 in the second deployed (washing) position during the washing operation is shown. Shown are the washing apparatus 104, the light tower 106, the second fluid line 112, the second spray pipe 122, the tractor 116, the support apparatus 118 and the PV panel 300, the PV panel top surface 302, and a distance 304. For clarity, hydraulic lines and electrical cords are not shown.

When the mobile PV washing system 100 is proximate to the PV panel 300 (or row of PV panels 300) and oriented to drive along the PV panel 300 or row of PV panels 300, the operator adjusts the spray pipes 120 122 such that the spray pipes 120 122 are generally parallel to the surface of the PV panels 300 and the spray heads 418 are at a generally consistent distance 304 from the PV panel top surface 302.

In one embodiment, the distance 304 is approximately 12"-24". The distance 304 of the spray heads 418 from the PV panel top surface 302 will generally vary depending on factors such as the intensity of the spray and the type of PV panels 300, but in general the distance 304 will be approximately 12"-24". In the embodiment shown, the adjustment of the spray pipes 120 122 includes moving upwards a portion of the washing apparatus 104 including the spray pipes 120 122. The adjustment also includes pivoting that portion of the washing apparatus 104 outwards, with the pivot point proximate to a lower end of the spray pipes 120 122. As a result, the spray pipes 120 122 in the deployed position are positioned such that all spray heads 418 are positioned to spray onto the PV panel 300.

The light tower 106 includes at least one light supported at the top of the tower and powered by the tractor 116. In some embodiments one or more additional lights are mounted to the tractor 116 at the front and/or rear of the tractor 116. In one embodiment, the light tower 106 includes 9 48-Watt LED lights 440. The light tower 106 is optional, and can be used while cleaning at night and/or in low-light conditions. In the embodiment shown in FIG. 3, the light tower 106 is non-adjustably coupled to the support apparatus 118. In other embodiments, such as that shown in FIG. 4, the light tower 106 is configured for an adjustable distance left or right moving as one with the washing apparatus 104 because both the light tower 106 and the washing apparatus 104 are coupled to an extension beam 404 as described further below in FIG. 4.

After cleaning is complete, the operator adjusts the washing apparatus 104 to the first non-washing position, enabling the tractor 116 to drive faster and in standard lanes, for example when the PV panels 300 are oriented in a single direction such that after washing a row the PV washing system 100 must return to the beginning of the rows to wash the next row.

Referring again to FIGS. 1-3, the mobile PV washing system 100 is faster and more economical than PV washing systems currently known in the art. The mobile PV washing system 100 as disclosed herein can wash PV panels 300 in rows spaced as narrowly as 55 inches apart. The PV washing system 100 also requires only one operator once water has been loaded into the PV washing system 100. The PV washing system 100 is also adaptable to PV panels 300 of different heights and widths. The use of the spray pipes 120 122 to spray water produces even and consistent washes on any number PV panels 300.

The PV washing system 100 can be used in any size of ground-mounted arrays. Some examples of applications of the PV washing system 100 are for PV panels 300 located at large solar farms, small solar farms, wineries, and dairies.

Mounting of the washing apparatus 104 to the tractor 116 enables the operator to take the existing tractor 116, which can be used for multiple other purposes when not in use for washing, and adapt it for washing of the PV panels 300. Use of the tractor 116 is therefore much more economical than buying a dedicated mobile washing system. The PV washing system 100 is reliable, flexible, mostly comprising reliable mechanical components, and produces consistent wash quality with very few electronic elements.

Figure 4:
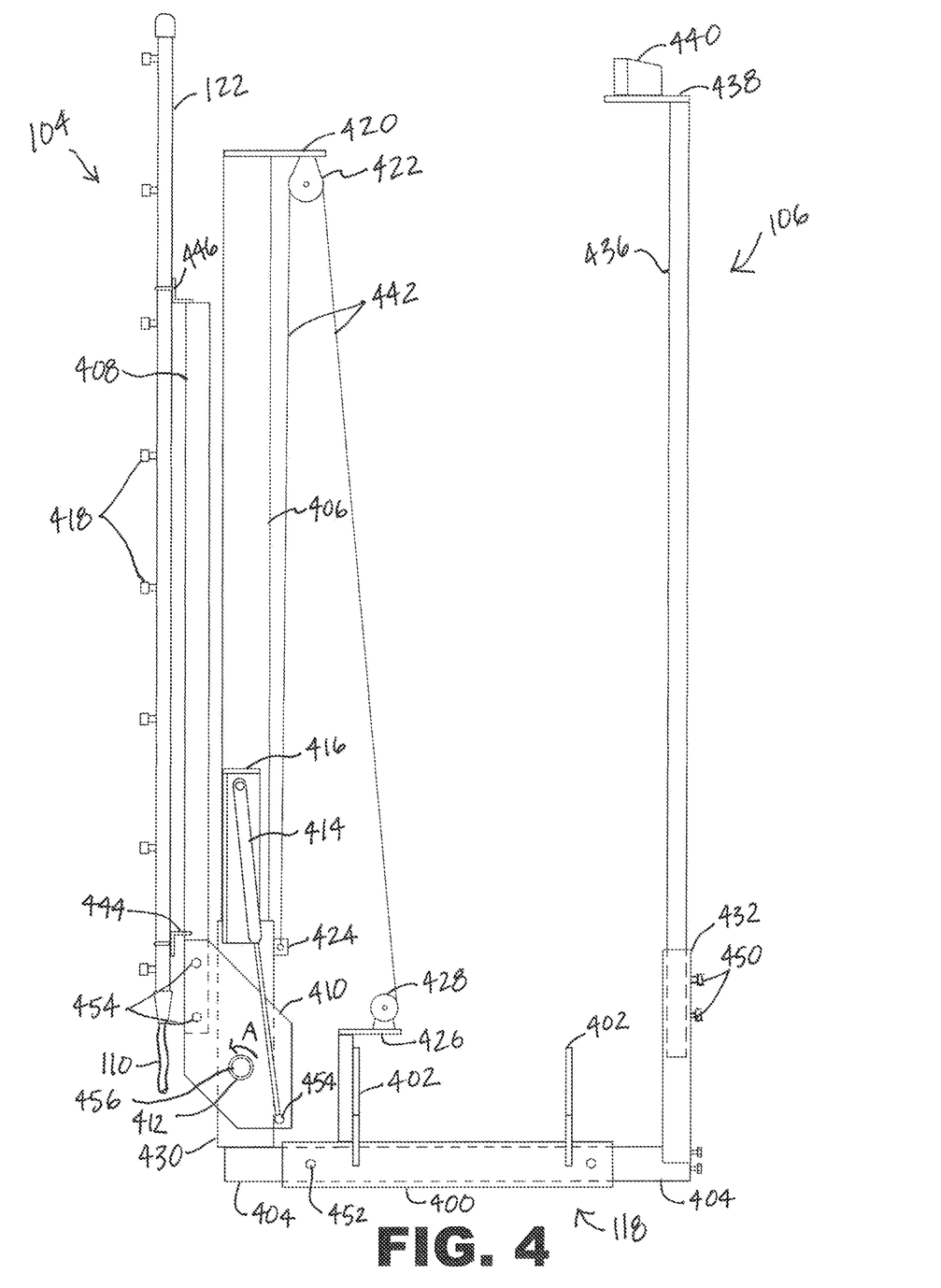
FIG. 4 is a front elevational view of a washing apparatus of the washing system in the first non-washing position, when the washing apparatus is not mounted to a tractor of the mobile PV washing system.
Figure 5:
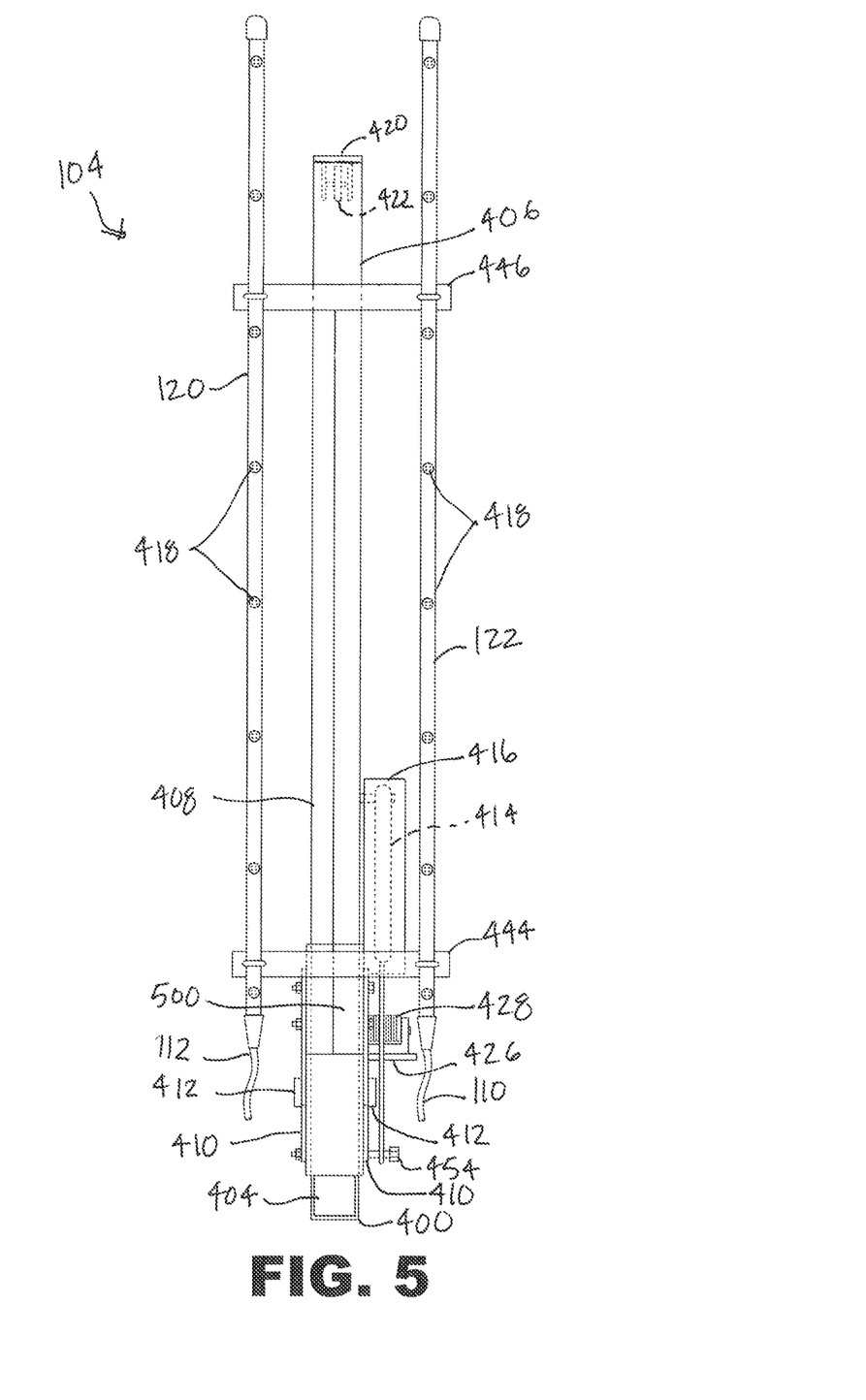
FIG. 5 is a side elevational view of the washing apparatus in the first non-washing position, when the washing apparatus is not mounted to the tractor.

Referring next to FIGS. 4 and 5, a front elevational view and a side elevational view (respectively) of the washing apparatus 104 in the first non-washing position is shown. The optional light tower 106 is shown in FIG. 4, but is omitted in FIG. 5 for clarity. Shown are the washing apparatus 104, the light tower 106, the first fluid line 110, the second fluid line 112, the support apparatus 118, the first spray pipe 120, the second spray pipe 122, a beam 400, two attachment plates 402, the extension beam 404, a primary post 406, a spray pipe post 408, a pivot plate 410, pivoting tubes 412, a hydraulic piston 414, a piston support member 416, the plurality of spray heads 418, a pulley support 420, a pulley 422, a cable anchor 424, a winch support 426, a winch 428, a sleeve 430, a light post support 432, a light post 436, a light support plate 438, at least one light 440, a cable 442, a lower spray pipe beam 444, an upper spray pipe beam 446, a plurality of light post fasteners 450, a plurality of set bolts 452, a plurality of pivot plate fasteners 454, a pivot plate hole 456, and an infill member 500. For clarity, hydraulic lines and electrical cords are not shown.

The support apparatus 118 comprises the generally horizontal beam 400 and the two attachment plates 402 rigidly coupled to and extending upwards from a top surface of the beam 400 in a generally vertical plane. The beam 400 in the present embodiment is a steel square tube shape but may be any shape or material suitable for supporting the static and dynamic loads of the washing apparatus 104 and the light tower 106 and transferring those loads to the tractor 116. The attachment plates 402 are configured to rigidly couple to the tractor 116 with fasteners or other methods/systems compatible with the tractor 116 or other suitable vehicle.

As previously shown in FIG. 2 showing the front view of the tractor, when the support apparatus 118 is attached to the front portion of the tractor 116 the support beam 400 extends leftward to support the washing apparatus 104 and rightward to support the optional light tower 106.

The generally horizontal extension beam 404 is slideable and fits within the tubular horizontal beam 400 and comprises a steel square tube shape. The extension beam 404 is rigidly coupled to and supported by the beam 400. In the present embodiment the connection of the extension beam 404 to the beam 400 allows for adjustment of the washing apparatus 104 and the light tower 106 along the axis of the beam 400 by removing the rigid coupling, sliding the extension beam 404 left or right with respect to the tractor 116, and then re-coupling the extension beam 404 to the beam 400 so that the extension beam 404 no longer moves (using the set bolts 452 or other fastener). In this way the spray pipes 120 122 and the light tower 106 are easily adjusted towards or away from the tractor 116. In other embodiments the extension beam 404 may be permanently rigidly coupled to the beam 400 by welding or other suitable fastening.

The primary post 406 is rigidly coupled to a left end of the extension beam 404. In some embodiments the extension beam 404 may be eliminated and the primary post 406 coupled directly to an end of the beam 400. The primary post 406 is a rectangular or square steel tube shape. The primary post 406 extends vertically upwards from the extension beam 404 and is rigidly coupled to the extension beam 404 by welding or other suitable fastening system providing the required stiffness and strength for supporting the elements of the washing apparatus 104. In order to provide smooth movement of the sleeve 430 over the primary post 406, the primary post 406 and the sleeve 430 must be appropriately sized to allow for a smooth material to be mounted to outside portions of the primary post 406 where the sleeve 430 passes over. The smooth material may comprise grease free acetal resin (e.g. Delrin®), HDPE, or other suitable material. The primary post 406 extends upwards a distance configured to support the pulley 422 and to maximize the height tolerance the PV washing system 100 is able to wash at. In some solar plants, the bottom of the PV panels 300 can be above 6' from the ground and then extend outward from there at a variable angle.

The pulley support 420 comprises a horizontal steel plate bolted to the top of the primary post 406 via two threaded bolts. The plate includes a ring welded to an underside of the horizontal steel plate and configured to couple to the pulley 422, which is clipped to the ring via a clevis. The pulley 422 is thereby mounted to the underside of the pulley support 420 and receives the cable 442.

The sleeve 430 is a vertically-oriented rectangular steel tube member configured to be slidably fit to and slide over the primary post 406. In the first, non-washing position, due to gravity the sleeve 430 is located at a lower end of the primary post 406 and a lower end of the sleeve 430 is supported by the extension beam 404. The length of the sleeve 430 is as required to receive the pivoting tubes 412, a first end of the hydraulic piston 414, and the cable anchor 424. One pivot tube 412 is rigidly coupled to each of a forward-facing face of the sleeve 430 and a rearward-facing face of the sleeve 430. Each pivot tube 412 is configured to couple to and support one pivot plate 410, and also allow for the pivot plates 410 to rotate about a central axis of the pivot tubes 412.

Each pivot plate 410 includes the pivot plate hole 456 which is configured to slide over the corresponding pivot tube 412 extending from the face of the sleeve 430, whereby the pivot plate 410 is supported by the pivot tube 412 and also is able to rotate about the pivot tube 412. When the pivot plates 410 are coupled to the pivot tubes 412 the sleeve 430 is interposed between the two pivot plates 410. As shown in FIG. 5, the pivot plates 410 are oriented such that each pivot plate plane is oriented vertically with each generally vertical pivot plate face parallel to the front and rear faces of the sleeve 430. The pivot plates 410 are further secured to the sleeve 430 by the horizontal pivot plate fasteners 454. The pivot plate fasteners 454 connect the two pivot plates 410 together, preventing outward horizontal movement of the pivot plates 410. In the present embodiment, one pivot plate fastener 454 is installed at a lower portion of the pivot plates 410 (and is also used to receive a lower end of the hydraulic piston 414), and two pivot plate fasteners 454 are installed at a top portion of the pivot plates 410 and pass through the infill member 500 and the spray pipe post 408. In the present embodiment, the lower pivot plate fastener 454 is a 1" diameter bolt, and the upper pivot plate fasteners 454 are ½" diameter bolts.

The spray pipe post 408 comprises a square tubular member coupled to at least one pivot plate 410 at a side of the pivot plate 410 distal to the beam 400, with the spray pipe post 408 interposed between the two pivot plates 410. In the first non-washing position, the spray pipe post 408 is oriented generally vertically. In the embodiment shown in FIGS. 4 and 5, as a lateral distance between the pivot plates 410 is greater than a width of the spray pipe post 408, the spray pipe post 408 is juxtaposed with and coupled to one pivot plate 410, and a resulting gap between the spray pipe post 408 and the other pivot plate 410 is filled by the infill member 500, interposed between and coupled to the spray pipe post 408 and the other pivot plate 410. In other embodiments no infill member is required, or other suitable means of coupling the spray pipe post 408 to both pivot plates 410 may be used.

The spray pipe post 408 extends vertically upwards and generally parallel to the primary post 406. The spray pipe post 408 terminates at the upper spray pipe beam 446, at a location proximate to the upper end of the primary post 406. The upper spray pipe beam 446 is coupled to and supported by the spray pipe post 408 at a middle portion of the spray pipe beam 446, and is oriented horizontally. In the present embodiment the upper spray pipe beam 446 is an L-shaped angle member with a first horizontal leg spanning over the spray pipe post 408 and a second vertical leg extending upwards and offset outwards from a left face of the spray pipe post 408 (i.e. offset from the side distal to the tractor 116). The lower spray pipe beam 444 is generally the same shape as the upper spray pipe beam 446. The lower spray pipe beam 444 is also oriented horizontally and coupled to and supported by the spray pipe post 408, except at a lower portion of the spray pipe post 408. The lower spray pipe beam 444 is oriented with the vertical leg extending downwards vertically, although in some embodiments the lower spray pipe beam 444 upper leg could extend upwards vertically.

The first spray pipe 120 and the second spray pipe 122 are oriented generally vertically and are coupled and supported by the upper spray pipe beam 446 and the lower spray pipe beam 444. The first spray pipe 120 and the second spray pipe 122 are spaced horizontally such that the spacing of the spray pipes 120 122 provides the desired spray to the PV panels 300 when in operation. The coupling of the spray pipes 120 122 to the spray pipe beams 444 446 may be configured to move the attachment location of either spray pipe 120 122 on the spray pipe beams 444 446 in order to adjust the vertical spacing of the spray pipes 120 122.

Each spray pipe 120 122 comprises a pipe with an inner diameter configured to receive a necessary water flow rate and pressure to produce the required spray from the generally evenly-spaced spray heads 418, which are fluidly coupled to the spray pipes 120 122. The spray heads 418 are configured to, in conjunction with the water pressure provided, result in the desired spray characteristics (diameter, pressure, flow, droplet size, etc.). In the present embodiment, the spray heads 418 are configured to minimize the amount of water required while still providing the desired cleaning effect. Each spray pipe 120 122 extends upwards past the upper spray pipe beam 446 to a height as required for providing spray to the PV panels 300. Each lower end of the spray pipes 120 122 is fluidly coupled to one fluid line 110 112 for receiving the filtered spray water.

Returning to the sleeve 430, the generally vertical piston support member 416 is coupled to an upper end of the sleeve 430. The piston support member 416 in the present embodiment comprises an L-shaped steel shape. An upper end of the piston support member 416 is coupled to an upper end of the hydraulic piston 414. The lower end of the hydraulic piston 414 is coupled to a lower portion of the proximate pivot plate 410 via one pivot plate fastener 454 (which is a 1" diameter bolt in the present embodiment), whereby in the non-washing position of FIGS. 4 and 5 the hydraulic piston 414 is in an extended position. When the hydraulic piston 414 is retracted, the hydraulic piston 414 rotates the pivot plate 410 in a counterclockwise direction, as indicated by the arrow "A" in FIG. 4. As the spray pipes 120 122 are coupled to the pivot plate 410, the rotation of the pivot plate 410 rotates the spray pipes 120 122 outwards to the desired washing angle, as previously shown in FIG. 3. After washing, the hydraulic piston 414 is extended again to the non-washing position, whereby the spray pipes 120 122 are returned to the generally vertical position.

The winch support 426 is coupled to and extends upwards from the beam 400 proximate to the primary post 406, but the precise location of the winch support 426 may vary depending on the configuration of the proximate attachment plate 402. The powered winch 428 is coupled to a top portion of the winch support 426. The winch 428 receives the cable 442. The cable 442 extends upwards and over the pulley 422, then downwards where it is coupled to the cable anchor 424. It will be understood that other support types/locations for the winch 428 can be contemplated, for example, the winch 428 may be coupled to a support including one or more attachment plates, or the winch 428 may be directly coupled to the beam 400.

The powered winch 428 is used for vertical adjustment of the spray pipes 120 122. In the non-washing position the cable 442 is fully extended and the sleeve 430 rests on the extension beam 404. When the cable 442 is reeled in by the winch 428, the sleeve 430 is pulled upwards along the primary post 406. As the spray pipes 120 122 are coupled to the sleeve 430, the spray pipes 120 122 are also pulled upwards. The spray pipes 120 122 can then be adjusted to the required height for washing. The adjustment may occur before or after the pivoting of the spray pipes 120 122.

The extension beam 404 passes through the beam 400 and extends outward from the right side of the beam 400. As previously described, the extension beam 404, allows for adjustment along the axis of the beam 400 by removing the rigid coupling, sliding the extension beam 404 out or in with respect to the beam 400, and then re-coupling the extension beam 404 to the beam 400 so that the extension beam 404 no longer moves (using the set bolt 452 or other fastener). In other embodiments the beam 400 may simply extend outward and directly support the light tower 106, as shown in FIGS. 2 and 3, with additional bracing as required.

The light post 436 of the optional light tower 106 is a generally vertical square tube steel post rigidly coupled to the portion of the extension beam 404 extending outward from the right side of the beam 400 (or coupled directly to the beam 400 in some embodiments). In the current embodiment the light post 436 is coupled to the beam 400 via the square tube steel light post support 432 rigidly coupled to (by welding or other suitable means) and extending upwards from the extension beam 404. The light post 436 is slidably fit within the light post support 432 and is removably coupled to the light post support 432 with the light post fasteners 450.

The light support plate 438 is oriented horizontally and coupled to an upper end of the light post 436. One or more lights 440 are mounted to the light support plate 438 and electrically coupled to the vehicle power source for operation by the operator. A height of the light post 436 is as required for desired lighting during operation of the washing system 100 during low-light or dark conditions.

Figure 6:
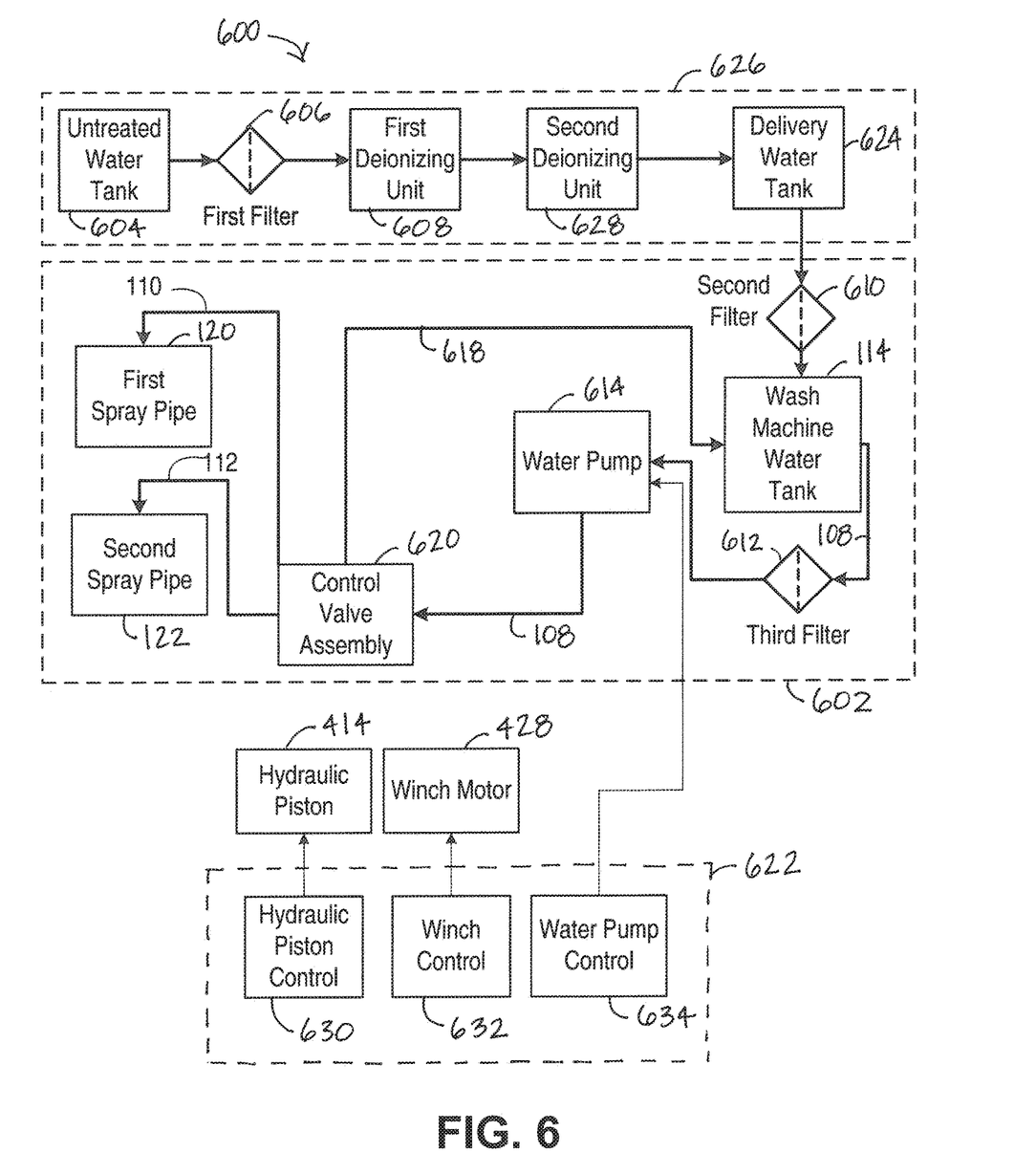
FIG. 6 is a schematic diagram of a water filtration system and the mobile PV washing system.

Referring next to FIG. 6, a schematic diagram of a water filtration and mobile PV washing system 600 including a mobile fluid system 602 and a filtering fluid system 626 is shown in one embodiment of the present invention. Shown are the tank line 108, the first fluid line 110, the second fluid line 112, the first spray pipe 120, the second spray pipe 122, the hydraulic piston 414, an untreated water tank 604, a first filter assembly 606, a first deionizing unit 608, a second filter 610, a third filter 612, a water pump 614, a bypass line 618, a control valve assembly 620, a control interface 622, a delivery water tank 624, a second deionizing unit 628, a hydraulic piston control 630, a winch control 632, and a water pump control 634. Bolded connection lines in the schematic diagram of FIG. 6 denote fluid flow, while non-bolded connection lines denote non-fluid connections.

The filtering fluid system 626 comprises the filtering and storage elements for treating the water prior to loading the water into the mobile fluid system 602, and includes the untreated water tank 604, the first filter assembly 606, the first deionizing unit 608, the second deionizing unit 628, and the delivery water tank 624.

The untreated water tank 604 receives and holds untreated water. The untreated water tank 604 is fluidly coupled to the first deionizing unit 608, which in the present embodiment is a deionizing skid unit mounted on a trailer. The fluid coupling includes the water passing through the first filter assembly 606, which comprises a 100 mesh filter, a water pump, and a pump skid. The 100 mesh filter is configured to remove larger debris (up to 100 mesh size).

In the embodiment shown in FIG. 6, the deionization method used is the Cation and Anion method, where two filtration units, the first deionizing unit 608 and the second deionizing unit 628, are used to demineralize the water. In another embodiment, the Mixed Bed type method may be used, where only one deionizing unit is required. The untreated water flows from the untreated water tank 604 through the first deionizing unit 608 and then through the second deionizing unit 628. The deionizing units in the present embodiment are rechargeable deionizing exchange tanks. The water output from the second deionizing unit 628 is pure mineral free water. In other embodiments the deionizing method and unit may be any commonly known to those of ordinary skill in the art and suitable outputting pure mineral free water for the PV washing system 100.

The deionized water is then output from the second deionizing unit 628 to the delivery water tank 624. In the present embodiment the delivery water tank 624 is mounted on a mobile water truck. The purified water then passes from delivery water truck 624 into the wash machine water tank 114, which is part of the PV washing system 100 as previously described. In the present embodiment the wash machine water tank 114 is a 550 gallon stainless steel custom tank. Stainless steel is used to prevent rusting inside the wash machine water tank 114, which in turn prevents clogging of the spray heads 418 and sediment from building up inside the wash machine water tank 114.

The wash machine water tank 114 is fluidly coupled to the second filter 610, which is an 80 mesh filter in the present embodiment. The water flows through the second filter 610 and then through the third filter 612, which is a 20 mesh filter in the present embodiment. During operation of the PV washing system 100, the water passes from the delivery water tank 624, through the second filter 610, into the wash machine water tank 114, and then through the third filter 612 when it leaves the wash machine water tank 114 on its way to the hydraulic plunger water pump 614. The water pump 614 is mounted to the water trailer 102 and powered by connecting to a hydraulic port of the tractor 116. The water pump 614 is fluidly coupled to and pumps the water to the control valve assembly 620. In another embodiment, a water pump powered by power take-off may be used instead of a hydraulic pump. The control valve assembly 620 is fluidly coupled to the tank line 108, the bypass line 618, the first fluid line 110, and the second fluid line 112. The control valve assembly 620 includes valves to each of the fluidly connected elements 114, 110, 112. The valves are controlled by the operator of the tractor 116. The control valve assembly 620 is located in the tractor cab such that the operator of the tractor 116 can control the flow of water to the spray pipes 120 122. The control valve assembly 620 is also coupled to spring-set emergency pop-off valves that act as safeties and are configured to prevent damage to the machine and to the PV (photovoltaic) panels 300 in case of operator error.

The hydraulic piston control 630, the winch control 632, and the water pump control 634 are also located within the cab. The hydraulic piston control 630 is operatively coupled to and controls the hydraulic piston 414, typically via a hydraulic port of the tractor 116. The water pump control 634 is operatively coupled to and controls the water pump 614. The winch control 632 is operatively coupled to and controls the winch 428. The controls 630, 632, 634 are configured to be operator-friendly when being controlled in conjunction with the control valve assembly 620. Since the water pump 614 is connected via the remote hydraulic connection of the tractor 116, the water pump 614 flow rate can be easily increased or decreased by increasing or decreasing the rpm of the tractor motor. The pressure and flow rate of the water exiting the spray heads 418 is fine-tuned by selecting the proper spray heads 418 and the control valve assembly 620.

When operating on a stand-by mode, i.e. when washing is not occurring, the control valve assembly 620 sends the water back to the wash machine water tank 114 via the bypass line 618. Valves to the first fluid line 110 and the second fluid line 112 are closed in stand-by mode. When the hydraulic piston 414 is used to rotate the spray pipes 120 122, the control valve assembly 620 can be in any mode and the hydraulic piston control 630 can be either turned on or turned off.

After turning on the water pump 614 by using the water pump control 634, in order to send water to the first spray pipe 120 and the second spray pipe 122 the operator uses the control valve assembly 620 to close the bypass line 618 and open the valves to the first fluid line 110 and the second fluid line 112, directing the water to the spray pipes 120 122 and out the spray heads 418 (not shown). The water pump control 634 also controls the pressure and flow of the water to the spray pipes 120 122 as required for the spray heads 418 and desired type of spray. In the present embodiment the flow is approximately 16 gpm at 400 psi.

Figure 7:
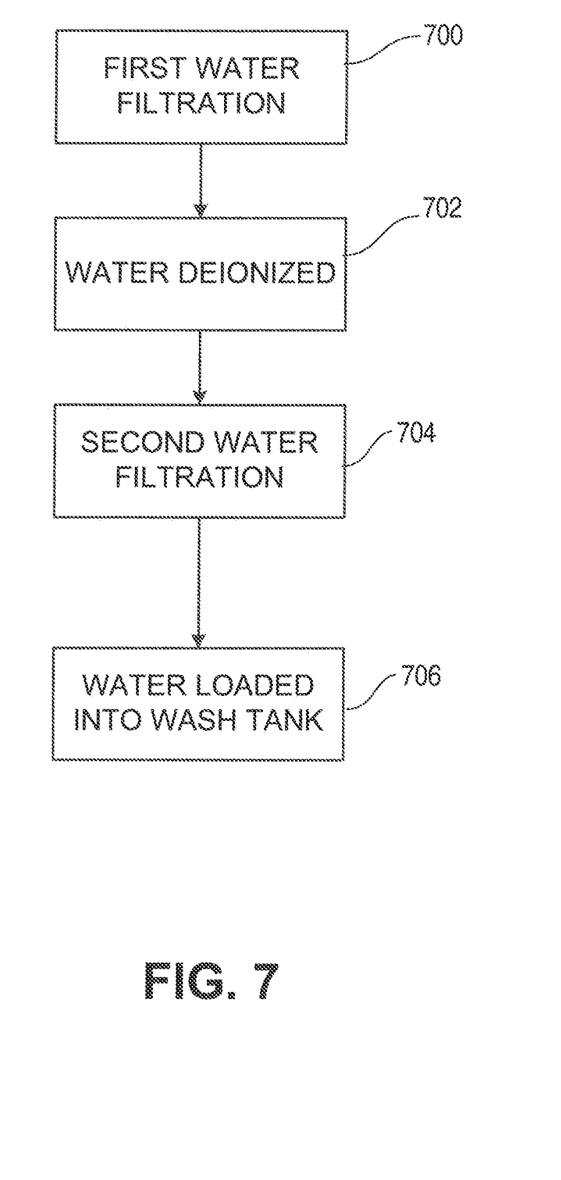
FIG. 7 is a flowchart of a PV washing system filtration method.

Referring next to FIG. 7, a flowchart of a PV washing system filtration method is shown in accordance with an embodiment of the present invention. Shown are a first water filtration step 700, a deionize water step 702, a second water filtration step 704, and a load water into wash tank step 706.

In the initial first water filtration step 700, water is taken from any source and filtered. In the present embodiment, the filtration is that of water passing through the first filter assembly 606, which includes a 100 mesh filter.

In the next deionize water step 702, the water that was passed through the first filter assembly 606 in the first water filtration step 700 is deionized. As described in FIG. 6, the deionizing may be using any suitable system or method. The method then proceeds to the second water filtration step 704.

During the second water filtration step 704, the water from the deionize water step 702 is again filtered. In the present embodiment, the filtration is by the second filter 610, an 80 mesh filter, which in the present embodiment is mounted to the water trailer 102.

In the last load water into wash tank step 706, the purified and filtered water is loaded into the wash machine water tank 114 of the mobile PV washing system 100. In the present embodiment, as the second filter 610 is mounted to the water trailer 102, the load water into wash tank step 706 occurs at substantially the same time as the second water filtration step 704 since the water passes through the second filter 610 and then immediately into the wash machine water tank 114.

The water is filtered prior to deionizing to eliminate any debris in the water before it enters deionizing tanks of the deionizing units 608 628 to prevent clogging of the deionizing tanks. The water is deionized to eliminate minerals, which in turn eliminates spotting on the PV panels 300 from the washing. After deionizing, the water is filtered to help prevent debris (such as in hoses) from entering the wash machine water tank 114. The water is filtered again after leaving the wash machine water tank 114 before entering the water pump 614 to reduce the chance of debris that may have been in the wash machine water tank 114 from getting stuck in the spray heads 418 when washing.

Figure 8:
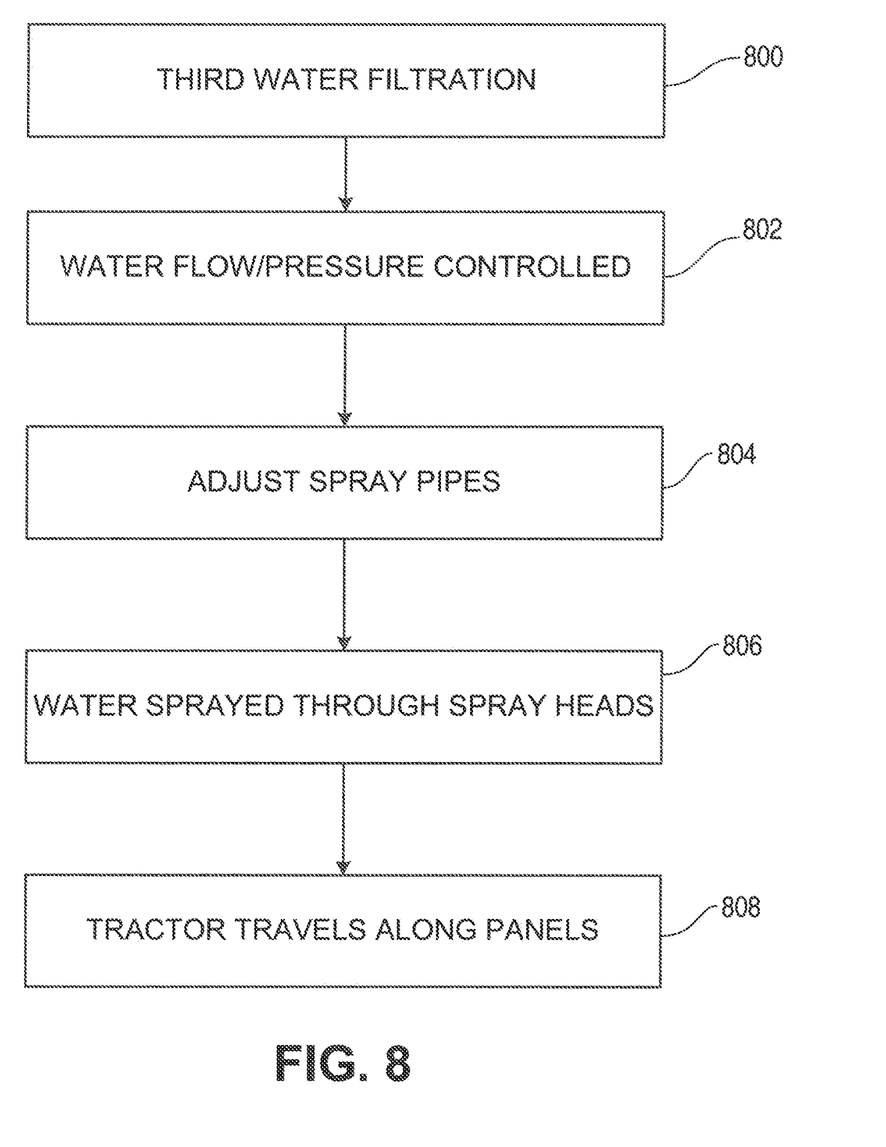
FIG. 8 is a flowchart of a PV washing system washing method.

Referring next to FIG. 8, a flowchart of a PV washing system washing method is shown in accordance with an embodiment of the present invention. Shown are a third water filtration step 800, a water flow/pressure control step 802, an adjust spray pipes step 804, a spray water step 806, and a tractor travels along panels step 808.

The PV washing method of FIG. 8 is designed to follow from the previous method of FIG. 7, where the water is initially treated and loaded into the wash machine water tank 114 of the mobile PV washing system 100. In the initial third water filtration step 800, a tank outlet valve fluidly coupled to the wash machine water tank 114 is opened, and the water pump 614 (fluidly coupled to the tank outlet valve) is turned on. The water pump 614 draws water from the wash machine water tank 114 and though the third filter 612 which is interposed between the water pump 614 and the tank outlet valve. In the present embodiment the third filter 612 is a 20 mesh filter. The water continues to flow to the control valve assembly 620.

In the next water flow/pressure control step 802, the water pump control 634 is used to control the pressure and flow of the water. In the present embodiment, the water pressure is approximately 16 gpm at 400 psi. Prior to washing, and when the water pump 614 is turned on, a bypass valve is opened, whereby the water flow is sent back to the wash machine water tank 114 and the fluid cycle repeats.

In the next adjust spray pipes step 804, when the system 100 arrives at the washing location the operator operates the winch 428 and/or the hydraulic piston 414 to adjust the spray pipes 120 122 to the desired height and angle for washing the PV panels 300. In the present embodiment, the spray heads 418 are 12"-24" from the top surface 302 of the PV panels 300.

In the spray water step 806, the operator closes the bypass valve of the water pump control 634, whereby the water flows to the spray pipes 120 122 and out through the spray heads 418.

In the tractor travels along panels step 808, the tractor 116 is driven along the row of PV panels 300 while the water continues to spray from the spray heads 418, whereby the PV panels 300 are washed. The speed of the tractor 116 is dependent on the degree of washing required and the terrain, i.e. a slower tractor speed will produce a greater degree of washing and a faster tractor speed will produce a lesser degree of washing.

Figure 9:
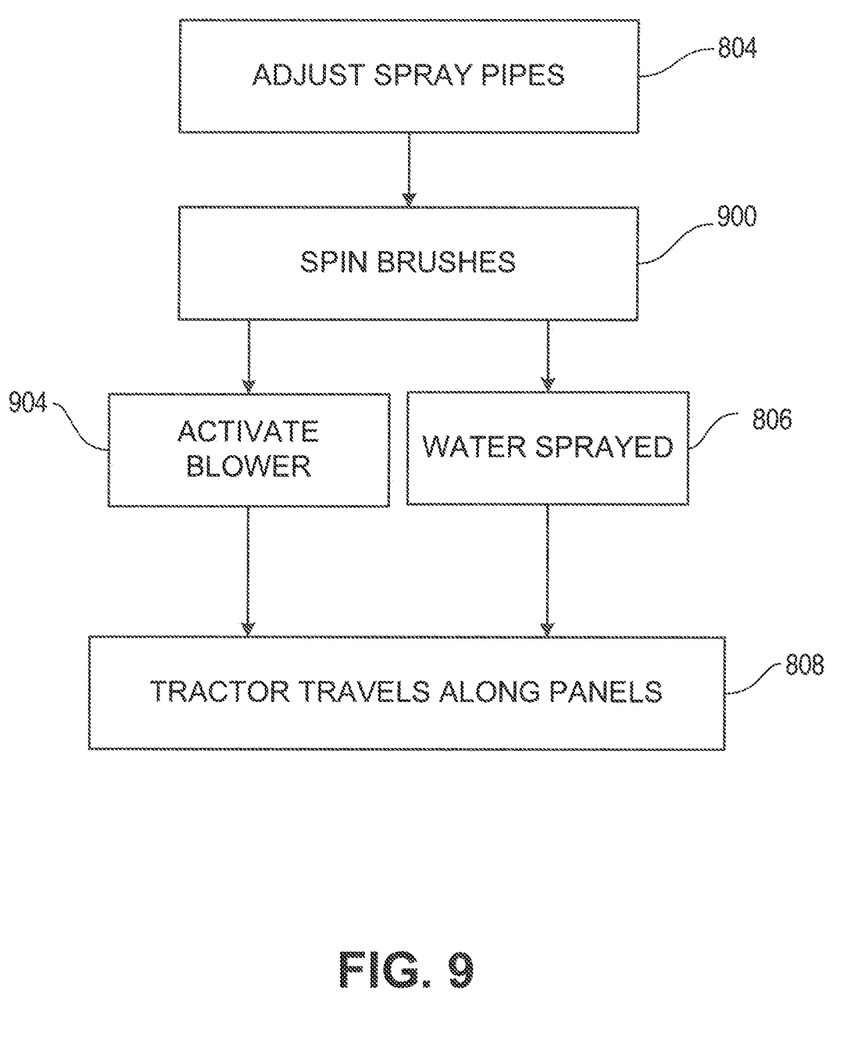
FIG. 9 is a flowchart of a PV washing system brushing method.

Referring next to FIG. 9, a flowchart of a PV washing system brushing method is shown in accordance with an embodiment of the present invention. Shown are the adjust spray pipes step 804, a spin brushes step 900, an activate blower step 904, the optional spray water step 806, and the tractor travels along panels step 808.

In an alternate embodiment, the spray pipes 120 122 are fitted with spinning brushes. In one embodiment the spray pipes 120 122 are each fitted with 5-29" diameter brushes. Each brush is electrically coupled to and powered by a 24V motor. In the first adjust spray pipes step 804, as in the method of FIG. 8 the spray pipes 120 122 are adjusted (rotationally and/or vertically) for desired position relative to the PV panels 300. In the method of FIG. 9, the spray pipes 120 122 will be adjusted for the desired brushing action on the PV panels 300 instead of the spray action.

In the next spin brushes step 900, the operator activates the brush controls, spinning the brushes. The brush controls include a control for reversing the spin direction of the brushes. The contacting of the spinning brushes with the PV panel 300 loosens dirt particles and other debris on the panel top surface 302.

In the next activate blower step 904, the operator activates the blower attached to the spray pipes 120 122. The blower blows the debris off of the PV panels 300, thereby cleaning the PV panel 300. In the present embodiment, the blower operates at 2530 cfm and 160 mph. The method then continues to the tractor travels along panels step 808.

In the optional spray water step 806, which follows from the spin brushes step 900, in lieu of using the blower in some embodiments the spray pipes 120 122 are also configured to spray water similarly to the method of FIG. 8. The method then continues to the tractor travels along panels step 808.

In the final tractor travels along panels step 808, the user drives the tractor 116 along the row of PV panels 300 to wash/clean each PV panel 300 as the tractor 116 passes by.

While the invention herein disclosed has been described by means of specific embodiments, examples and applications thereof, numerous modifications and variations could be made thereto by those skilled in the art without departing from the scope of the invention set forth in the claims.

What is claimed is:

1. A mobile washing system comprising:
   a vehicle;
   a wheeled fluid tank removably coupled to the vehicle; and
   at least one spray pipe removably mounted near a side of the vehicle using a support apparatus, the support apparatus comprising
      a horizontal beam;
      a support beam traversably extending from the horizontal beam and configured to support the at least one spray pipe;
      an attachment fixture configured to removably couple the support apparatus to a front of the vehicle;
   wherein the at least one spray pipe is fluidly coupled to the fluid tank via at least one fluid line and includes a plurality of spray heads configured to spray fluid;
   wherein the at least one spray pipe is movable from a first position to a second position;
   wherein the at least one spray pipe is oriented in a generally vertical direction when in the first position;
   wherein the at least one spray pipe is oriented in a direction other than generally vertical when in the second position; and
   wherein the at least one spray pipe is fully supported by the vehicle when in the first position and the second position; and
   wherein the at least one spray pipe is transversally actuatable;
   wherein the horizontal beam is tubular and comprises an inner dimension;
   wherein the support beam is tubular and comprises an outer dimension that is less than or equal to the inner dimension of the horizontal beam; and
   wherein the support beam slidably engages with the horizontal beam.

2. The mobile washing system of claim 1 further comprising
   a second support beam traversably extending from the horizontal beam; and
   a second attachment fixture configured to removably couple the horizontal beam to the front of the vehicle.

3. The mobile washing system of claim 1, wherein the vehicle is a tractor.

4. The mobile washing system of claim 1, further comprising
   a deionizing system coupled to the vehicle; and
   a filter coupled to the at least one fluid line, whereby fluid running to the at least one spray pipe is filtered and deionized.

5. The mobile washing system of claim 4, wherein the filter is a 20 mesh filter.

6. The mobile washing system of claim 1, wherein the fluid tank comprises stainless steel.

7. The mobile washing system of claim 1, further comprising a generally vertical light tower mounted on the vehicle, wherein the vertical light tower includes at least one light and is powered by the vehicle.

8. The mobile washing system of claim 7, wherein the vertical light tower is mounted to an extension beam removably coupled to the vehicle.

9. The mobile washing system of claim 1 further comprising
   a powered winch system comprising a winch and a cable, and configured to raise and lower the at least one spray pipe relative to the vehicle;
   wherein the at least one spray pipe is traversable in a vertical direction when the cable is reeled into the winch.

10. The mobile washing system of claim 1, wherein the at least one spray pipe is rotatable and includes a hydraulic piston that, when actuated, rotates the at least one spray pipe about an axis proximate to a lower end of the at least one spray pipe.

11. The mobile washing system of claim 1, further comprising a 100 mesh filter, 80 mesh filter, and a 20 mesh filter coupled to the at least one fluid line, whereby fluid running to the at least one spray pipe is filtered.

12. The mobile washing system of claim 1 further comprising at least two spray pipes mounted near a side of the vehicle, wherein each spray pipe has at least one fluid line configured to spray water.

13. The mobile washing system of claim 1, wherein the at least one spray pipe further comprises a brush.

14. The mobile washing system of claim 1 further comprising a blower.

15. The mobile washing system of claim 1, wherein the overall width of the mobile washing system does not exceed fifty-five inches when in the first position.

* * * * *